United States Patent
Downer et al.

[19]

[11] Patent Number: 5,916,028
[45] Date of Patent: Jun. 29, 1999

[54] ONE-PIECE TRELLIS WIRE SUPPORT ASSEMBLY

[75] Inventors: Paul A. Downer, Sebastopol; John S. Downer, Santa Rosa, both of Calif.

[73] Assignee: Vineyard Industry Products Co., Windsor, Calif.

[21] Appl. No.: 08/778,409

[22] Filed: Jan. 2, 1997

[51] Int. Cl.$^6$ ............................................. A01G 17/06
[52] U.S. Cl. ................... 47/46; 47/45; 47/47; 248/302; 248/218.4
[58] Field of Search .............. 248/302, 65, 218.4, 248/121; 47/45–47

[56] References Cited

U.S. PATENT DOCUMENTS

| | | |
|---|---|---|
| 115,662 | 6/1871 | Underhill . |
| 997,022 | 7/1911 | Tennant ........................................ 47/46 |
| 1,060,593 | 5/1913 | Green . |
| 1,851,224 | 3/1932 | Weber . |
| 4,099,299 | 7/1978 | Bruggert et al. . |
| 4,270,581 | 6/1981 | Claxton et al. . |
| 4,965,961 | 10/1990 | Broyles . |
| 5,144,768 | 9/1992 | Hiyama et al. . |
| 5,501,035 | 3/1996 | Downer et al. . |

FOREIGN PATENT DOCUMENTS

| | | | |
|---|---|---|---|
| 2683752 A1 | 6/1993 | France .................................... | 47/44 |
| 636498 | 6/1983 | Switzerland ............................. | 47/44 |
| 13127 | 6/1914 | United Kingdom .................... | 47/47 S |
| 380871 | 10/1932 | United Kingdom ................... | 47/47 S |

*Primary Examiner*—Terry Lee Melius
*Assistant Examiner*—Arpad Fabian Kovacs
*Attorney, Agent, or Firm*—Flehr Hohbach Test Albritton & Herbert

[57] ABSTRACT

Trellis wire support assembly (21) for use with a grape stake (23), comprising: an elongated wire member (80) formed with a pair of horizontally extending arms (24, 26) dimensioned to extend outwardly from grape stake (23), arms (24, 26) each including an outwardly extending support arm portion (31) for support of a trellis wire thereon and an inwardly and vertically extending retention arm portion (51) extending back and substantially over outwardly extending support arm portion (31); retention arm portions (51) being of a length sufficient to retain trellis wires (32*a*, 32*b*) between support arm portions (31) and retention arm portions (51) for both an upright and an inverted mounting orientation of trellis wire support assembly (21) on grape stake (23); elongated wire member (80) being formed to substantially encircle grape stake (23) at an elevated position thereon with each of retention arm portions (31) terminating in a distal end (52) spaced outwardly from grape stake (23) to define a trellis wire-receiving opening (53); and one of the pair of horizontally extending arms (24, 26) having a length sufficient to be looped vertically around the other of the pair of horizontally extending arms when wire member (80) is mounted on grape stake (23) to secure wire member (80) to grape stake (23).

4 Claims, 5 Drawing Sheets

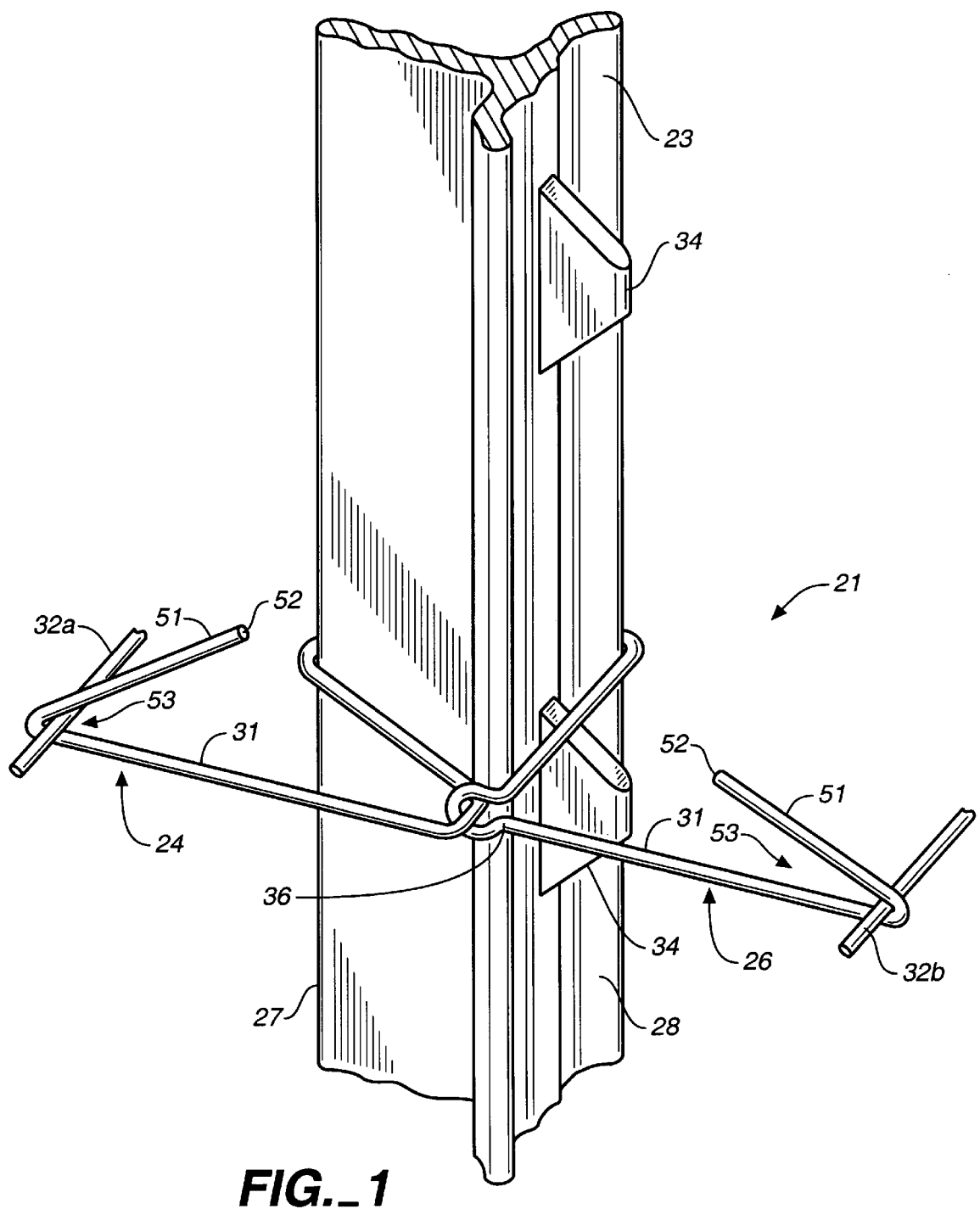
FIG._1

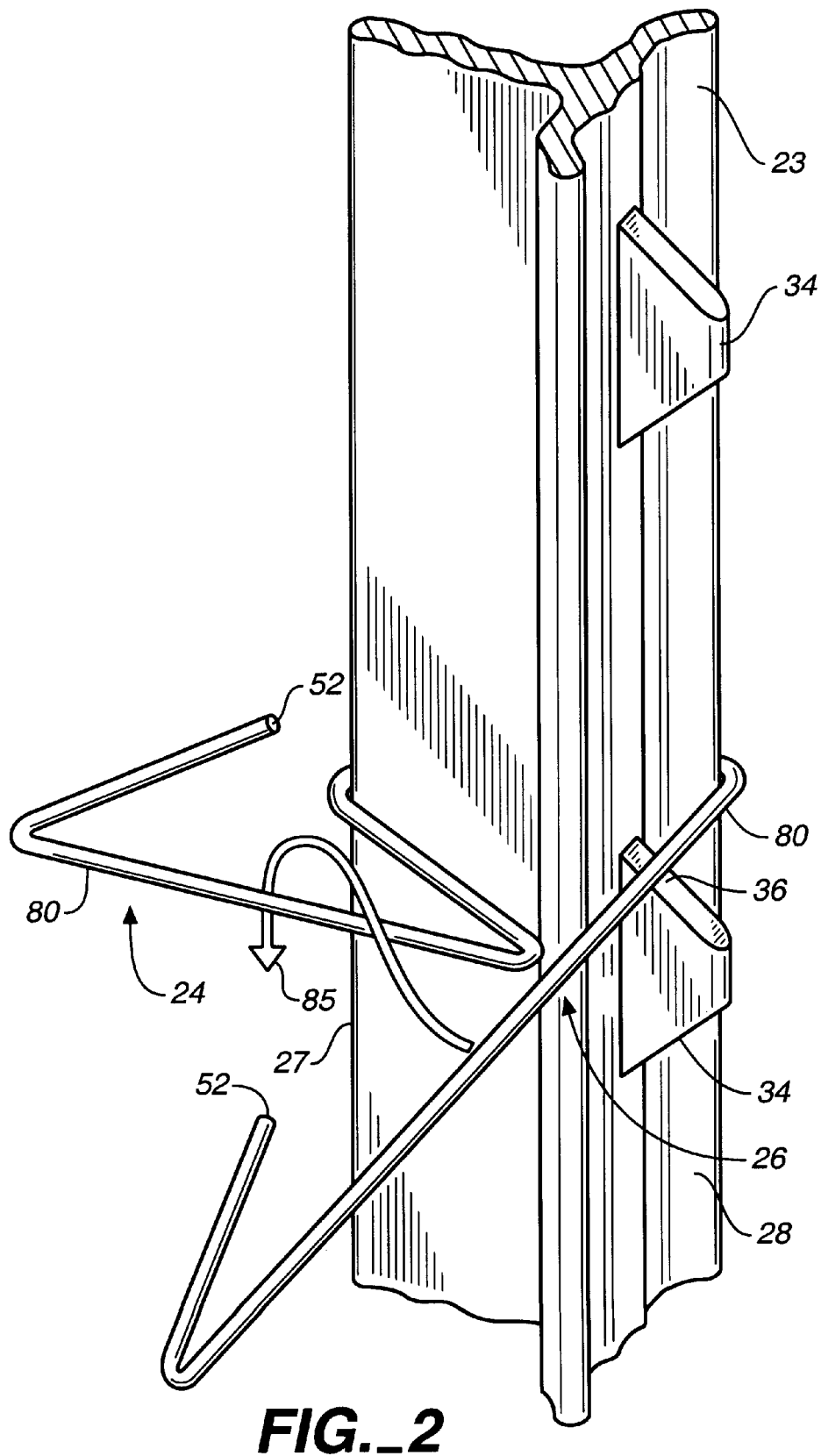
FIG._2

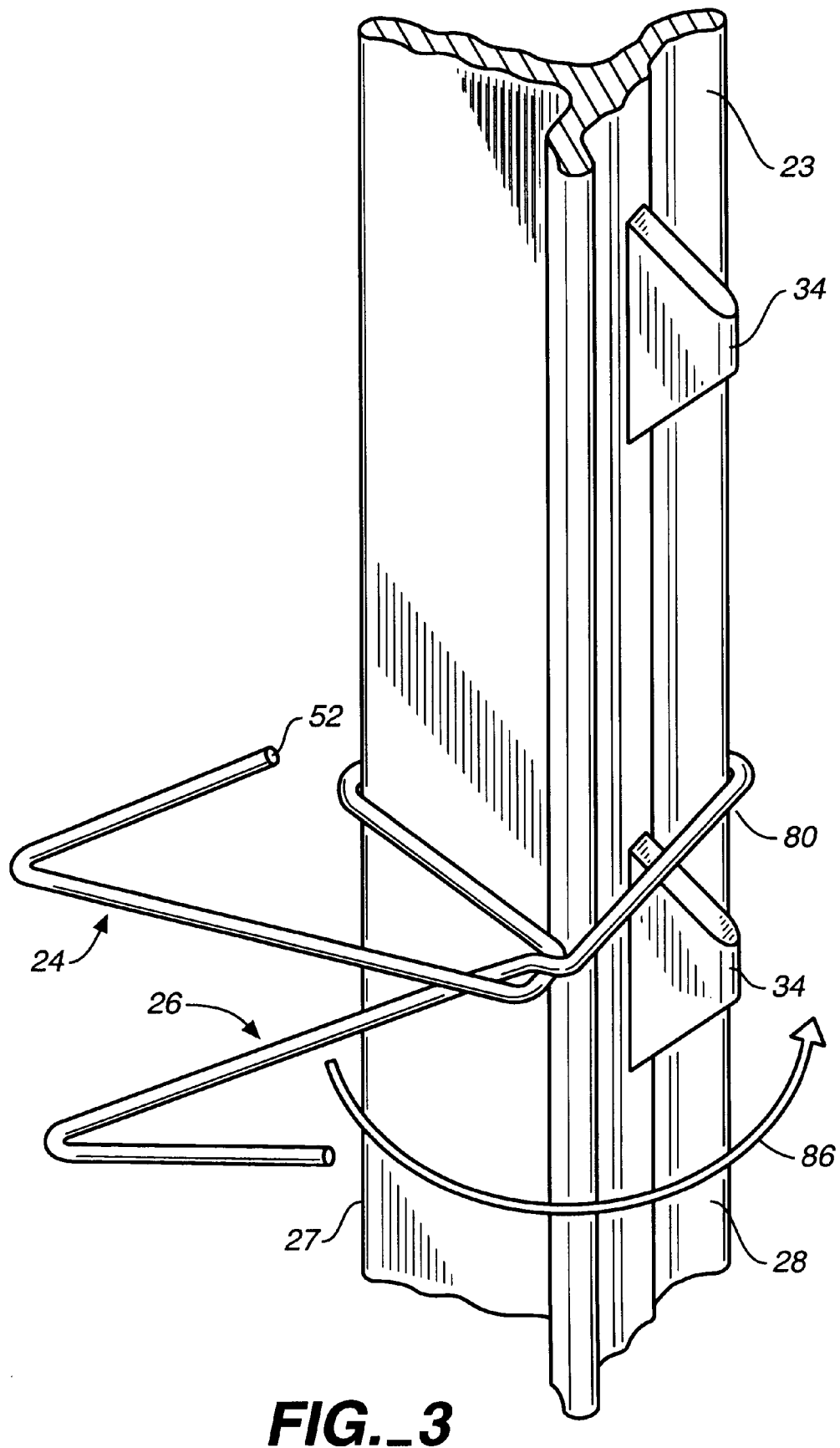
FIG._3

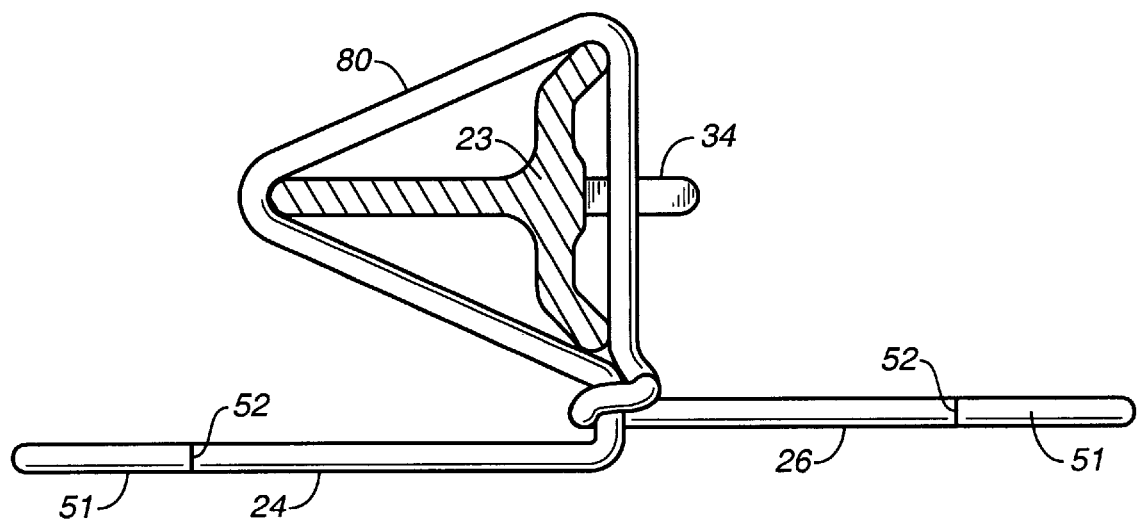
FIG._4

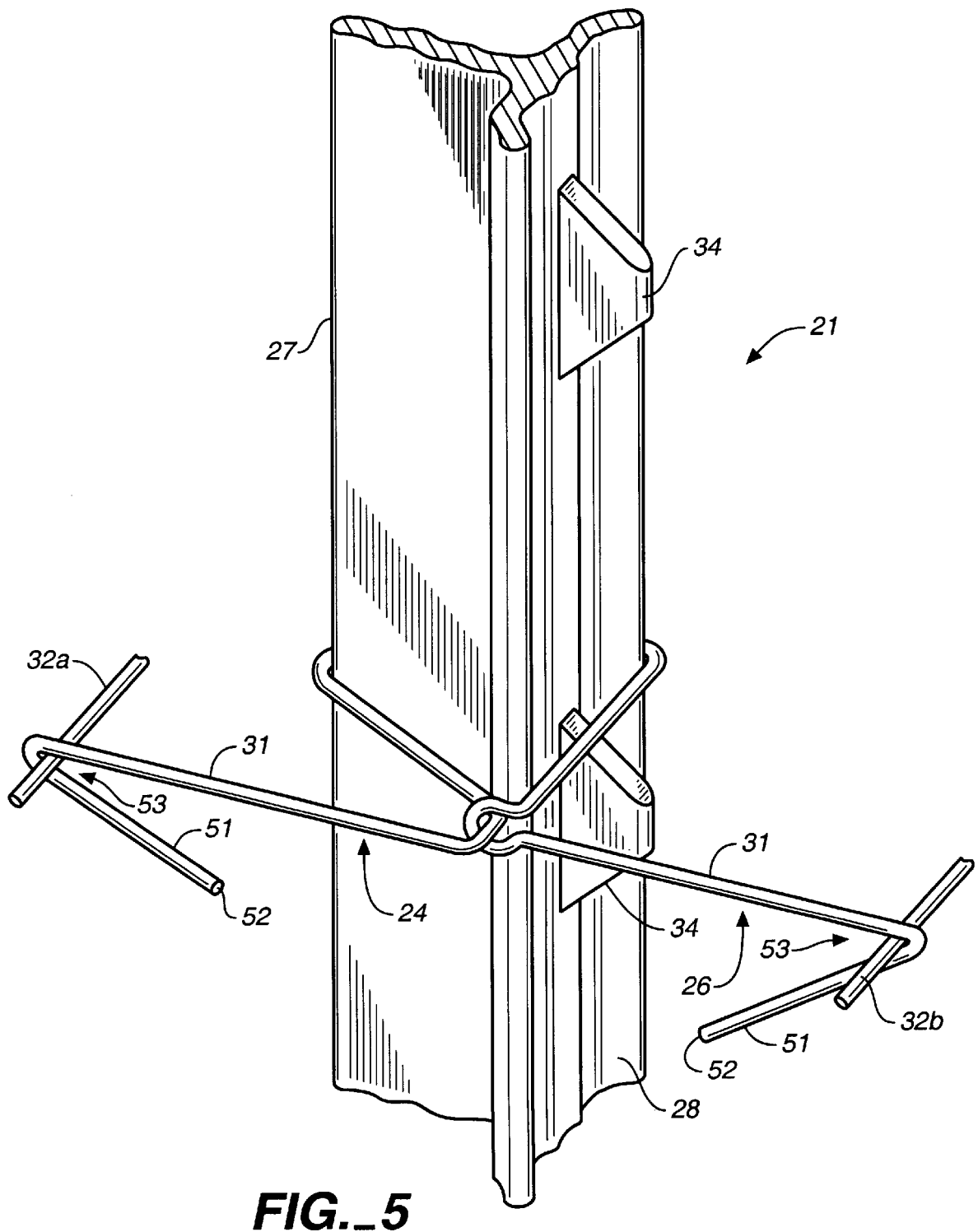
FIG._5

ONE-PIECE TRELLIS WIRE SUPPORT ASSEMBLY

TECHNICAL FIELD

The present invention relates, in general, to support assemblies used to support trellis wires from grape stakes, and more particularly, to wire-based support assemblies used in vertical grapevine trellising.

BACKGROUND OF THE INVENTION

Vertical trellising of grapevines is used to support the foliage of a grapevine in an elevated position relative to the grapes or berries. This exposes the berries to more direct sunlight, which is helpful to berry development.

U.S. Pat. No. 5,501,035 to Downer, et al. disclosed a trellis wire support assembly comprising a first wire member and a second wire member. The first wire member had a pair of arms formed to support trellis wires against both upward and downward loading. The second wire member was plastically deformed to cinch around and securely fasten the first wire member to a vertical grape stake. This trellis wire support assembly overcame many of the disadvantages which had been seen in the prior art. In particular, these earlier prior art systems were unable to easily mount and remove their trellis wires from the actual wire support assembly, and were also unable to retain the trellis wires in circumstances where an upward loading force was present on these wires. Therefore, these prior art trellis wire support assemblies could not be easily and quickly installed on grape stakes using only simple tools. Accordingly, they had required a tedious and costly installation procedure.

In spite of its many advantages, however, the Downer system still has some remaining disadvantages. Specifically, it required the use of two separate wire support members which were to be used in conjunction with one another. This required the first wire member to be held in position against the side of a grape stake while the second wire member was then plastically deformed to cinch around this first wire member and thereby securely fasten this first wire member to the grape stake, thus forming the installed trellis wire support assembly. This second wire member was of a small size and it had to be held snugly in position against the first wire member when being plastically deformed. Due to this small size, an installer could easily fumble with this second wire member during its installation. An installer was also required to hold both the first and second wire members simultaneously in position against the side of the grape stake when installing this trellis wire support assembly. For these two reasons, an operator was typically required to use additional holding and twisting tools when installing the existing Downer trellis wire assembly. A final disadvantage of this assembly was that it was specifically limited to receive only one particular size and shape of grape stake. This was due to the fact that the particular grape stake being used had a T-shaped cross-section and therefore the wire members wrapped around the periphery of this cross-section following a triangular path around this T-shape. specifically, the first wire member wrapped around two sides of the triangle and the second wire member enclosed the final third side of this triangle. Since the first wire member was bent to be pre-angled to wrap only around a particular size and shape periphery of grape stake, and since the second wire member was formed of a particular length to span the third size of this triangle, the existing Downer trellis wire assembly was not freely adaptable for use with variously sized grape stakes, without modifications being made to both the size and/or bended shape of the first and second wire members.

Consequently, it is an object of the present invention to provide a trellis wire support assembly which does not require the use of a small second wire member in its installation.

It is a further object that this new trellis wire support assembly be easily adaptable for installation on differently sized grape stakes without requiring the use of special installation tools.

It is another object that the present trellis wire support assembly be easily installable without the installer fumbling with the assembly during its attachment to a grape stake.

DISCLOSURE OF THE INVENTION

The present invention discloses a one-piece trellis wire support assembly for use with a grape stake, comprising: an elongated wire member formed with a pair of horizontally extending arms dimensioned to extend outwardly from the grape stake, the arms each including an outwardly extending support arm portion for support of a trellis wire thereon and an inwardly and vertically extending retention arm portion extending back and substantially over the outwardly extending support arm portion; the retention arm portions being of a length sufficient to retain the trellis wire between the support arm portion and the retention arm portion for both an upright and an inverted mounting orientation of the trellis wire support assembly on the grape stake; the elongated wire member being formed to substantially encircle the grape stake at an elevated position thereon with each of the retention arm portions terminating in a distal end spaced outwardly from the grape stake to define a trellis wire-receiving opening; and one of the pair of horizontally extending arms having a length sufficient to be looped vertically around the other of the pair of horizontally extending arms when the wire member is mounted on the grape stake to secure the wire member to the grape stake.

Also disclosed is the method of forming a trellis wire support assembly for use with a grape stake, comprising:

a) upwardly bending the ends of an elongated wire member to form a pair of horizontally extending arms dimensioned to extend outwardly from the grape stake, the arms each including an outwardly extending support arm portion for support of a trellis wire thereon and an inwardly and vertically extending retention arm portion extending back over the outwardly extending support arm portion towards the grape stake, the retention arm portions being of a length sufficient to retain the trellis wire between the support arm portions and the retention arm portions for both an upright and an inverted mounting orientation of the trellis wire support assembly on the grape stake, the retention arm portions each terminating in a distal end spaced outwardly from the grape stake to define a trellis wire-receiving opening with, and outwardly of, the grape stake, b) encircling the elongated wire member around the grape stake such that the wire member is secured to the grape stake at an elevated position on and in a substantially fixed angular position about a longitudinal axis of the grape stake, thereby preventing rotation of the elongated wire member about the longitudinal axis, and ensuring that a first arm of said pair of horizontally extending arms have a length sufficient to be looped vertically around a second arm of said pair of horizontally extending arms, and c) wrapping a first arm of the pair of horizontally extending arms around a second arm of the pair of horizontally extending arms.

BRIEF DESCRIPTION OF THE DRAWINGS

FIG. 1 is a perspective view of a one-piece trellis wire support assembly constructed in accordance with the present invention and mounted on a grape stake post having a T-shaped cross-section.

FIG. 2 is a perspective view of a first intermediate stage in the mounting of the present one-piece trellis wire support assembly to the T-post grape stake.

FIG. 3 is a perspective view of a second intermediate stage in the installation of the present one-piece trellis wire support assembly on the T-post grape stake.

FIG. 4 is a top elevation view of the one-piece trellis wire support assembly of FIG. 1.

FIG. 5 is a perspective view of the one-piece trellis wire support assembly as was shown in FIG.1, with its retention portions of its arms angled downwardly.

BEST MODE OF CARRYING OUT THE INVENTION

The one-piece trellis wire support assembly of the present invention is very well suited for vertical trellising of grapevines and also provides support to attached trellis wires against both upward and downward loading. The present invention is specifically designed as an improvement to U.S. Pat. No. 5,501,035 to Downer. In particular, the present invention specifically overcomes the need for the second small wire member that was used in the Downer two-piece trellis wire support assembly. The avoidance of this second wire member in the present invention makes installation faster and easier, avoids an installer fumbling with this small second wire member, avoids the need for special installation tools, and avoids the installer having to hold two wire members simultaneously in position against the grape stake during installation of the assembly. The present invention further provides an assembly which can easily be installed on differently-sized grape stakes having T-shaped cross-sectional areas.

As is best seen in FIG. 1, the one-piece trellis wire support assembly, which is generally designated 21, can be seen to extend around grape stake 23, the trellis wire support assembly 21 having a pair of arms 24 and 26 which extend outwardly from the sides of grape stake 23. Preferably, arms 24 and 26 extend directly outwards from the opposite sides 27 and 28 of the grape stake 23. However, as the installation of assembly 21 is formed by an operator bending the assembly into its preferred final shape, arms 24 and 26 can also easily be angled to extend outwards from grape stake 23 at angles different from those extending directly outwards from opposite sides 27 and 28 of grape stake 23. This would enable much greater flexibility in the final positioning of arms 24 and 26 than was seen in the Downer U.S. Pat. No. 5,501,035 system where arms 24 and 26 were designed as parts of a first wire member which was not bent during its installation. In the present invention, however, arms 24 and 26 would not necessarily be limited to extend from grape stake 23 only at a pre-formed angle of 180 degrees apart from one another as arms 24 and 26 are part of a continuous one piece wire trellis assembly and are therefore designed to be easily bent into final shape by the installer.

Each of arms 24 and 26 includes a support arm portion 31 upon which a trellis wire such as 32a or 32b may be supported. These support arm portions 31 are connected to retention arm portions 51 which extend vertically and inwardly from the support arm portions 31 back towards grape stake 23, terminating at distal ends 52. Retention arm portions 51 and support arm portions 31 thereby together define a trellis wire receiving opening 53 on either side of the present assembly. As shown, retention arm portions 51 are vertically spaced above support arm portions 31 such that trellis wires 32a and 32b are prevented from becoming easily detached from trellis wire assembly 21 when upwardly loaded. This orientation of support arm portions 31 and retention arm portions 51 is of course preferred when the trellis wires 32a and 32b are downwardly loaded as these wires will then be firmly held in position by support arm portions 31. Alternatively, as is shown in FIG. 5, retention arm portions 51 can instead be vertically spaced below support arm portions 31, thereby allowing support arm portions 31 to provide support when the trellis wires 32a and 32b are upwardly loaded, yet enabling retention arm portions 51 to prevent these trellis wires from becoming easily detached from trellis wire assembly 21 when these trellis wires 32a and 32b become downwardly loaded. Consequently, the present invention is able to restrain the motion of the attached trellis wires 32a and 32b under both upward or downward loading conditions, and whether the assembly is positioned in an upright orientation as shown in FIG. 1 or in an inverted orientation as shown in FIG. 5. Accordingly, trellis wires 32a and 32b will be restrained in their motion against both these upward and downward forces.

Typically, both upward and downward loading on trellis wires 32a and 32b will be encountered when using the present assembly either in its upright orientation as shown in FIG. 1 or in an inverted orientation as shown in FIG. 5. The possibility of both upward and downward loading occurring is caused by the following factors. The natural tendency in the system is that the weight of the supported vine and foliage tends to droop outwardly down away from the grape stake thus producing an outward and downward force on the trellis wires. In this event, the upright orientation for the assembly as shown in FIG. 1 is especially desirable wherein the trellis wires are held by support arm portions 31. Under wind loading, however, the foliage may act as a sail and thereby cause an upward loading force on the trellis wires. Retention arm portions 51 will act to hold the trellis wires firmly in position under these conditions. The inverted orientation as shown in FIG. 5 is especially useful for conditions of upward loading on trellis wires 32a and 32b which may occur not only under the conditions of wind loading but also may occur on rolling terrain where trellis wire support assembly 21 is mounted in valleys or depressions. Even with this inverted orientation, it is quite possible, however, that wind loading can produce a downward force on trellis wire 32b, with retention arm portions 51 again holding the trellis wires firmly in position.

As stated, in each of the above cases, retention arm portions 51 extend inwardly toward grape stake 23 by an amount or distance sufficient to retain trellis wires 32a and 32b between the support arm portions 31 and the retention arm portions 51 for both the upright mounting orientation of FIG. 1 and the inverted mounting orientation shown in FIG. 5. Most preferably, retention portions 51 extend back towards grape stake 23 by a distance at least equal to half the distance by which support arm portions 31 extend outwardly from opposite sides 27 and 28 of grape stake 23. It is also preferable that these retention arm portions 51 be relatively superimposed on or in aligned relationship with support arm portions 31. It will be understood, however, that such alignment is not absolutely essential for the retention of trellis wires 32a and 32b against upward or downward loading forces.

The method of fastening trellis wire support assembly 21 to grape stake 23 is best understood by viewing FIGS. 2 and 3 in sequence as these FIGS represent a sequence of intermediate steps in the installation of trellis wire assembly 21, culminating in the final assembled form as was shown in FIG. 1.

Trellis wire support assembly 21 is essentially composed of a one-piece wire member 80. As best seen in FIG. 2, the first step in installing assembly 21 is wrapping this one-piece wire member 80 around the periphery of grape stake 23 ensuring that a sufficient length remains to form arm 26. Specifically, arm 26 must be of a length sufficient to be looped vertically around arm 24 such that as this looping shortens arm 26, arm 26 will, as is shown in FIG. 1, be of a final length relatively equal to arm 24. It is to be understood that arm 26 could either be looped under or over arm 24 and that arm 26 may be looped one or more times around arm 24 keeping within the scope of the present invention. Arms 24 and 26 are each bent so as to form support arm portions 31 and retention arm portions 51. This bending can be performed before or after the vertical looping of arm 26 around arm 24.

Continuing with the forming of the present assembly, arm 26 is then bent in the direction following arrow 85 such that arm 26 becomes looped vertically around arm 24 as is shown in FIG. 3. Arm 26 is then to be bent in the direction of arrow 86 such that arm 26 reaches the position as was shown in FIG. 1, being roughly parallel to, and lying in the same horizontal plane, as arm 24.

As can be seen in FIG. 4, support assembly 21 is wrapped tightly around the perimeter of grape stake 23. Accordingly, it is not possible to freely rotate support assembly 21 about the axis of the grape stake after the installation of this support assembly 21 upon grape stake 23.

The vertical looping of arm 26 around arm 24 can be quickly and easily performed without requiring wire holding and twisting tools. The advantage of this method of installation over the existing Downer system is that the installer need not simultaneously hold two wire members, need not fumble with a small secondary wire member, and may begin by wrapping wire member 80 around grape stakes of various sizes.

As stated above, arm 26 is formed to have a length sufficient to be looped vertically around arm 24 when support assembly 21 is mounted on grape stake 23. This looping secures support assembly 21 to the grape stake 23. As is shown in the figures, trellis wire support assembly 21 is presently mounted to a T-post grape stake, but it will be understood that the assembly of the present invention can be mounted to grape stakes having other configurations. This is possible because single wire 80 is simply wrapped by an installer around the perimeter of a grape stake. In contrast, in the existing Downer system, a first wire member was pre-angled to wrap around two sides of the triangular perimeter of a certain size of grape stake. Accordingly, the present invention is compatible with a range of sizes and dimensions of grape stakes. To provide proper support, however, these grape stakes should all include a plurality of vertically spaced, outwardly extending studs 34 which facilitate the coupling of assembly 21 to the grape stake 23 in a fixed vertical position. The wrapping of arm 26 around arm 24 should be performed in a manner such that the assembly 21 is sufficiently snug against the stake 23 so as to bear upon stud 34 at area 36 to thereby further resist any tendency of the assembly to slip down the grape stake when vertically downwardly loaded. This same area 36 will similarly bear against the stud 34 above if the loading is in an upward direction.

It is preferable that this wire assembly be formed of a spring steel as this can be plastically deformed as described in connection with mounting and demounting of the assembly. Most preferably, the wire member is formed of a stainless steel having a gauge in the range of about 10–14 gauge, with 11 and 12 gauge being preferred. Accordingly, trellis wire assembly 21 is relatively inexpensive to fabricate and to install on grape stakes.

What is claimed is:

1. A trellis wire support assembly for use with a grape stake, comprising:

an elongated wire member formed with a pair of horizontally extending arms dimensioned to extend outwardly from said grape stake, said arms each including an outwardly extending support arm portion for support of a trellis wire thereon and an inwardly and vertically extending retention arm portion extending back inwardly and substantially over said outwardly extending support arm portion;

said retention arm portions extending back a distance sufficient to retain said trellis wire between said support arm portion and said retention arm portion for both an upright and an inverted mounting orientation of said trellis wire support assembly on said grape stake;

said elongated wire member including a loop central portion for encircling said grape stake at an elevated position thereon with each of said retention arm portions terminating in a distal end spaced outwardly from said grape stake to define a trellis wire-receiving opening; and one of said pair of horizontally extending arms being looped vertically around the other of said pair of horizontally extending arms when said wire member is mounted on said grape stake to secure said wire member to said grape stake.

2. The trellis wire of claim 1 wherein said elongated wire member has sufficient length to loop around a variety of grape stakes having different widths.

3. The method of forming a trellis wire support assembly for use with a grape stake, comprising:

a) upwardly bending the ends of an elongated wire member to form a pair of horizontally extending arms dimensioned to extend outwardly from said grape stake, said arms each including an outwardly extending support arm portion for support of a trellis wire thereon and an inwardly and vertically extending retention arm portion extending back over said outwardly extending support arm portion towards said grape stake, said retention arm portions being of a length sufficient to retain said trellis wire between said support arm portions and said retention arm portions for both an upright and an inverted mounting orientation of said trellis wire support assembly on said grape stake, said retention arm portions each terminating in a distal end spaced outwardly from said grape stake to define a trellis wire-receiving opening with, and outwardly of, said grape stake, b) encircling said elongated wire member around said grape stake such that said wire member is secured to said grape stake at an elevated position on and in a substantially fixed angular position about a longitudinal axis of said grape stake, thereby preventing rotation of said elongated wire member about said longitudinal axis, and ensuring that a first arm of said pair of horizontally extending arms have a length sufficient to be looped vertically around a second arm of said pair of horizontally extending arms, and c) wrapping a first arm of said pair of horizontally extending arms around a second arm of said pair of horizontally extending arms.

4. The method of forming a trellis wire support assembly for use with a grape stake, comprising:

a) downwardly bending the ends of an elongated wire member to form a pair of horizontally extending arms dimensioned to extend outwardly from said grape stake, said arms each including an outwardly extending support arm portion for support of a trellis wire thereon and an inwardly and vertically extending retention arm portion extending back under said outwardly extending support arm portion towards said grape stake, said retention arm portions being of a length sufficient to retain said trellis wire between said support arm portions and said retention arm portions for both an upright and an inverted mounting orientation of said trellis wire support assembly on said grape stake, said retention arm portions each terminating in a distal end spaced outwardly from said grape stake to define a trellis wire-receiving opening with, and outwardly of, said grape stake, b) encircling said elongated wire member around said grape stake such that said wire member is secured to said grape stake at an elevated position on and in a substantially fixed angular position about a longitudinal axis of said grape stake, thereby preventing rotation of said elongated wire member about said longitudinal axis, and ensuring that a first arm of said pair of horizontally extending arms have a length sufficient to be looped vertically around a second arm of said pair of horizontally extending arms, and c) wrapping a first arm of said pair of horizontally extending arms around a second arm of said pair of horizontally extending arms.

* * * * *